United States Patent
Park et al.

(10) Patent No.: US 8,911,902 B2
(45) Date of Patent: Dec. 16, 2014

(54) NICKEL-BASED POSITIVE ELECTRODE ACTIVE MATERIAL, METHOD OF PREPARING THE SAME, AND LITHIUM BATTERY USING THE NICKEL-BASED POSITIVE ELECTRODE ACTIVE MATERIAL

(75) Inventors: Do-Hyung Park, Yongin-si (KR); Seon-Young Kwon, Yongin-si (KR); Min-Han Kim, Yongin-si (KR); Ji-Hyun Kim, Yongin-si (KR); Chang-Hyuk Kim, Yongin-si (KR); Jeong-Seop Lee, Yongin-si (KR); Yoon-Chang Kim, Yongin-si (KR)

(73) Assignee: Samsung SDI Co., Ltd., Yongin-si, Gyeonggi-do (KR)

(*) Notice: Subject to any disclaimer, the term of this patent is extended or adjusted under 35 U.S.C. 154(b) by 482 days.

(21) Appl. No.: 13/102,926

(22) Filed: May 6, 2011

(65) Prior Publication Data
US 2012/0009476 A1 Jan. 12, 2012

Related U.S. Application Data

(60) Provisional application No. 61/361,855, filed on Jul. 6, 2010.

(51) Int. Cl.
| | |
|---|---|
| *H01M 4/13* | (2010.01) |
| *H01M 4/525* | (2010.01) |
| *H01M 10/0525* | (2010.01) |
| *C01G 53/00* | (2006.01) |
| *H01M 4/36* | (2006.01) |
| *H01M 4/505* | (2010.01) |
| *H01M 4/131* | (2010.01) |

(52) U.S. Cl.
CPC ............. *H01M 4/131* (2013.01); *H01M 4/525* (2013.01); *H01M 10/0525* (2013.01); *C01G 53/006* (2013.01); *H01M 4/366* (2013.01); *H01M 4/505* (2013.01); *Y02T 10/7011* (2013.01); *Y02E 60/122* (2013.01); *C01G 53/50* (2013.01)

USPC ...... 429/223; 429/224; 423/594.4; 423/594.6

(58) Field of Classification Search
USPC .......... 429/223, 224, 231.1, 231.3; 423/591.2
See application file for complete search history.

(56) References Cited

U.S. PATENT DOCUMENTS

2009/0068561 A1* 3/2009 Sun et al. ...................... 429/223

FOREIGN PATENT DOCUMENTS

| EP | 2214234 A1 | 8/2010 |
|---|---|---|
| JP | 10-236826 | 9/1998 |
| JP | 2002-184403 | 6/2002 |
| JP | 2003-034538 A | 2/2003 |
| JP | 2003-242976 A | 8/2003 |
| JP | 2006-073482 A | 3/2006 |
| JP | 2007-048711 | 2/2007 |
| JP | 2009-137834 A | 6/2009 |
| JP | 2009-525578 A | 7/2009 |
| JP | 2010-015959 A | 1/2010 |
| KR | 100744759 B1 | 7/2007 |
| KR | 10-0744759 B | 8/2007 |
| KR | 10-0812547 B | 3/2008 |
| WO | WO 2007/114557 A1 | 10/2007 |
| WO | WO 2009/063613 A1 | 5/2009 |

OTHER PUBLICATIONS

JP, 2003-242976, a raw machine translation (Abstract).*
JP, 2003-242976, a raw machine translation (Claims and Detailed Description).*
KR 10-0812547 B1 (a raw machine translation).*
Extended European Search Report issued by the European Patent Office dated Nov. 4, 2011, 8 pages.

* cited by examiner

*Primary Examiner* — Milton I Cano
*Assistant Examiner* — Carmen Lyles-Irving
(74) *Attorney, Agent, or Firm* — Knobbe Martens Olson & Bear LLP

(57) ABSTRACT

A nickel (Ni)-based positive electrode active material, a method of preparing the same, and a lithium battery using the Ni-based positive electrode active material.

13 Claims, No Drawings

NICKEL-BASED POSITIVE ELECTRODE ACTIVE MATERIAL, METHOD OF PREPARING THE SAME, AND LITHIUM BATTERY USING THE NICKEL-BASED POSITIVE ELECTRODE ACTIVE MATERIAL

CROSS-REFERENCE TO RELATED APPLICATIONS

This application claims priority to and the benefit of Provisional Patent Application No. 61/361,855 filed in the U.S. Patent and Trademark Office on Jul. 6, 2010, the entire contents of which are incorporated herein by reference.

BACKGROUND

1. Field

One or more embodiments relate to a nickel (Ni)-based positive electrode active material, a method of preparing the same, and a lithium battery using the Ni-based positive electrode active material.

2. Description of the Related Art

Demands for secondary batteries, which are used while being repeatedly charged and discharged by using powers of portable electronic equipments for information and communication, such as personal digital assistants (PDAs), mobile phones, and lap tops, electric bikes, or electric vehicles, are remarkably increasing.

Specifically, lithium batteries are drawing the most attention since the lithium batteries have high voltages and high energy densities.

The lithium batteries generate electric energy through oxidation and reduction reactions when lithium ions are intercalated/deintercalated from a positive electrode and a negative electrode, which each includes an active material capable of intercalating and deintercalating the lithium ions, while an organic electrolyte solution or polymer electrolyte solution is filled between the positive electrode and the negative electrode.

A nickel (Ni)-based complex oxide from among positive electrode active materials used in a positive electrode of a lithium battery needs to be improved because the Ni-based complex oxide has an unstable structure due to a large amount of lithium that is deintercalated during charging, capacity deterioration is easily generated in the Ni-based complex oxide through charging and discharging, and thermal stability of the Ni-based complex oxide may be decreased due to a reaction with an electrolyte solution.

SUMMARY

Technical Goal of the Invention

One or more embodiments include a positive electrode active material having improved efficiency and improved electrochemical characteristics.

One or more embodiments also include a method of preparing a positive electrode active material having improved efficiency and improved electrochemical characteristics.

One or more embodiments also include a lithium battery including a positive electrode active material having improved efficiency and improved electrochemical characteristics.

Effect of the Invention

As described above, according to the one or more of the above embodiments, a lithium battery has excellent efficiency and improved electrochemical characteristics since a positive electrode active material distributes lithium ions in a different concentration gradient form a surface portion to a core portion.

DETAILED DESCRIPTION

Reference will now be made in detail to embodiments. In this regard, the present embodiments may have different forms and should not be construed as being limited to the descriptions set forth herein. Accordingly, the embodiments are merely described below to explain aspects of the present description.

One or more embodiments include a positive electrode active material, in which lithium ions are distributed in a concentration gradient continuously decreasing from a surface portion to a core portion of a lithium nickel complex oxide.

The lithium nickel complex oxide may be represented by Formula 1 below.

$$Li_a[Ni_xCo_yMn_z]O_2 \quad \text{Formula 1}$$

Here, $0.8 \leq a \leq 1.2$, $0.5 \leq x \leq 0.6$, $0.2 \leq y \leq 0.3$, $0.2 \leq z \leq 0.3$, and $x+y+z=1$.

The lithium nickel complex oxide may include a surface portion represented by Formula 2, and a core portion represented by Formula 3 below.

$$Li_a[Ni_xCo_yMn_z]O_2 \quad \text{Formula 2}$$

Here, $1.1 \leq a \leq 1.2$, $0.5 \leq x \leq 0.6$, $0.2 \leq y \leq 0.3$, $0.2 \leq z \leq 0.3$, and $x+y+z=1$.

$$Lia[NixCoyMnz]O_2 \quad \text{Formula 3}$$

Here, $0.8 \leq a \leq 0.9$ $0.5 \leq x \leq 0.6$, $0.2 \leq y \leq 0.3$, $0.2 \leq z \leq 0.3$, and $x+y+z=1$.

Alternatively, the lithium nickel complex oxide may include a surface portion represented by Formula 4 below, and a core portion represented by Formula 5 below.

$$Li_a[Ni_xCo_yMn_z]O_2 \quad \text{Formula 4}$$

Here, $1.1 \leq a \leq 1.2$, $0.5 \leq x \leq 0.6$, $0.2 \leq y \leq 0.3$, $0.2 \leq z \leq 0.3$, and $x+y+z=1$.

$$Li_a[Ni_xCo_yMn_z]O_2 \quad \text{Formula 5}$$

Here, $a=0$, $0.5 \leq x \leq 0.6$, $0.2 \leq y \leq 0.3$, $0.2 \leq z \leq 0.3$, and $x+y+z=1$.

Particles of the lithium nickel complex oxide generally have an average diameter of about below 20 μm. Here, the average diameter denotes a diameter of a sphere having the same volume as the particle.

For example, the average diameter of the particles may be about below 3 or 5 μm, but is not limited thereto.

The surface portion denotes a surface and a peripheral area of the surface of the positive electrode active material, and for example, may be about 10% of a radius of the particle from a surface to a core.

The core portion denotes a core and a peripheral area of the core of the positive electrode active material, and for example, may be about 50% of the radius of the particle from the core to the surface.

Preparation costs of $LiCoO_2$, which is currently widely used as a positive electrode active material, are high due to its maldistribution and scarcity, and it is difficult to stably supply $LiCoO_2$. Accordingly, an NCM-based (lithium nickel cobalt manganese-based) lithium nickel complex oxide has come into the spotlight as a replacement of $LiCoO_2$.

However, the lithium nickel complex oxide is structurally unstable since the amount of lithium ions that are deintercalated is large during charging compared to $LiCoO_2$, and capacity deterioration is easily generated in the lithium nickel complex oxide through charging and discharging, compared to $LiCoO_2$.

Due to structural instability of the lithium nickel complex oxide, the capacity deterioration is highly likely to be generated as a temperature increases, and thermal stability may decrease due to a reaction with an electrolyte solution.

Accordingly, considering deintercalating and intercalating of the lithium ions during charging and discharging, a distribution of the lithium ions of the lithium nickel complex oxide may be improved.

Since only about 50 to about 60% lithium ions actually move between a positive electrode and a negative electrode during charging and discharging in a lithium nickel complex oxide, a lithium nickel complex oxide having different lithium ion concentrations from a surface portion to a core portion, is required, wherein more lithium ions are distributed in an area that is actually used more, specifically in the surface portion, and less lithium ions are distributed in the core portion.

Here, the meaning of "different lithium ion concentrations" is that the concentration of the lithium ions gradually changes.

Accordingly, in the lithium nickel complex oxide of Formula 1, a mole ratio of lithium to nickel (hereinafter, referred to as a Li/Ni mole ratio) of the surface portion may be about 1.02 to about 1.8 times, for example, from about 1.22 to about 1.5 times, a Li/Ni mole ratio of the core portion.

In detail, in the lithium nickel complex oxide of Formula 1, 2, or 4, the Li/Ni mole ratio of the surface portion may be from about 1.83 to about 2.4, for example from about 1.83 to about 2, or from about 2.2 to about 2.4.

In the lithium nickel complex oxide of Formula 1 or Formula 3, the Li/Ni mole ratio of the core portion may be from about 1.3 to about 1.8, for example, from about 1.3 to about 1.5, or from about 1.6 to about 1.8.

A mole ratio of lithium to cobalt (hereinafter, referred to as a Li/Co mole ratio) and a mole ratio of lithium to manganese (hereinafter, referred to as a Li/Mn mole ratio) of the surface portion of the lithium nickel complex oxide of Formula 1, 2, or 4 may each be from about 3.6 to about 6.0, for example, from about 3.6 to about 5.5, or from about 4 to about 6.

In the lithium nickel complex oxide of Formula 1 or Formula 3, the Li/Co mole ratio and the Li/Mn mole ratio of the core portion may each be from about 2.6 to about 4.5, for example, from about 2.6 to about 4 or from about 3 to about 4.5.

In other words, when the number of lithium ions in the surface portion is within the above range, the lithium nickel complex oxide is less likely to generate capacity deterioration at a high temperature, and has high thermal stability.

When the above ranges are satisfied, reactivity of the lithium nickel complex oxide with an electrolyte solution is decreased, and thus less gas is generated. Accordingly, thermal stability is improved.

A well known technology is used to observe a change of lithium ion concentration. An amount of lithium ions existing on the surface portion may be measured by using an X-ray photoelectron spectroscopy (XPS), and a composition of the lithium ions of the lithium nickel complex oxide may be analyzed by using inductively coupled plasma (ICP).

As described above, efficiency and electrochemical characteristics of a lithium battery may be improved by preparing the lithium nickel complex oxide, in which the lithium ions are differently distributed from the surface portion to the core portion, or only exist in the surface portion and not in the core portion.

One or more embodiments also include a method of preparing a positive electrode active material, the method including: preparing a mixed solution including a nickel salt solution, a cobalt salt solution, and a manganese salt solution; forming a nickel complex oxide precursor by adding a base material to the mixed solution; and forming a lithium nickel complex oxide by mixing a lithium-containing material to the nickel complex oxide precursor and thermally treating the resultant, wherein lithium ions are distributed in a concentration gradient continuously decreasing from a surface portion to a core portion of the lithium nickel complex oxide.

The lithium nickel complex oxide may be represented by Formula 1 below.

$$Li_a[Ni_xCo_yMn_z]O_2 \quad \text{Formula 1}$$

Here, $0.8 \leq a \leq 1.2$, $0.5 \leq x \leq 0.6$, $0.2 \leq y \leq 0.3$, $0.2 \leq z \leq 0.3$, and $x+y+z=1$.

Alternatively, the lithium nickel complex oxide may include a surface portion represented by Formula 2 below, and a core portion represented by Formula 3 below.

$$Li_a[Ni_xCo_yMn_z]O_2 \quad \text{Formula 2}$$

Here, $1.1 \leq a \leq 1.2$, $0.5 \leq x \leq 0.6$, $0.2 \leq y \leq 0.3$, $0.2 \leq z \leq 0.3$, and $x+y+z=1$.

$$Li_a[Ni_xCo_yMn_z]O_2 \quad \text{<Formula 3>}$$

Here, $0.8 \leq a \leq 0.9$ $0.5 \leq x \leq 0.6$, $0.2 \leq y \leq 0.3$, $0.2 \leq z \leq 0.3$, and $x+y+z=1$.

Alternatively, the lithium nickel complex oxide may include a surface portion represented by Formula 4 below, and a core portion represented by Formula 5 below.

$$Li_a[Ni_xCo_yMn_z]O_2 \quad \text{Formula 4}$$

Here, $1.1 \leq a \leq 1.2$, $0.5 \leq x \leq 0.6$, $0.2 \leq y \leq 0.3$, $0.2 \leq z \leq 0.3$, and $x+y+z=1$.

$$Li_a[Ni_xCo_yMn_z]O_2 \quad \text{Formula 5}$$

Here, $a=0$, $0.5 \leq x \leq 0.6$, $0.2 \leq y \leq 0.3$, $0.2 \leq z \leq 0.3$, and $x+y+z=1$.

The method may use one reactor or at least two reactors or more. The reactor may include a rotor using an inverted wing method, and a baffle spaced apart from an inner wall of the reactor.

A coprecipitation method may be used to form the nickel complex oxide precursor, which will be described below.

The coprecipitation method simultaneously precipitates at least two elements or compounds in an aqueous solution by using a precipitation reaction.

For example, if a lithium nickel cobalt manganese precursor is to be prepared, a nickel salt, a cobalt salt, and a manganese salt may each use a sulphate, a nitrate, an acetate, a halide, a hydroxide, or an oxyhydroxide. The lithium nickel cobalt manganese precursor may be prepared by preparing an aqueous solution by mixing the nickel salt, the cobalt salt, and the manganese salt in a desired mole ratio, and then adding and coprecipitate the base material to the aqueous solution to maintain pH of the aqueous solution to be basic.

Examples of the base material include be a sodium hydroxide, a potassium hydroxide, or a lithium hydroxide, and the base material may be a sodium hydroxide, but is not limited thereto.

During such a coprecipitation process, an additive and/or an alkali-carbonate may be further added to the aqueous solution.

The additive is not specifically limited, and may be used to form a transition metal and a complex. Examples of the additive include an ammonium ion donor, a compound of ethylene diamines, and a compound of citric acids.

Examples of the ammonium ion doner include an ammonia solution, an ammonium sulfate aqueous solution, and an ammonium nitrate aqueous solution.

Also, the alkali-carbonate may be selected from the group consisting of an ammonium carbonate, a potassium carbonate, and lithium carbonate, any combinations thereof.

During the coprecipitation process, a temperature, a pH, a reaction time, concentration of slurry, or ion concentration may be suitably controlled to adjust a ratio of components or amounts of salt ions, and moreover, to adjust an average particle diameter, particle diameter distribution, and particle density.

The surface portion may form a precursor having higher density than the core portion so that the surface portion has higher lithium ion concentration than the core portion in the lithium nickel complex oxide.

In the forming of the nickel complex oxide precursor, a concentration of the nickel complex oxide precursor may be from about 0.5 M to about 3.5 M.

A reaction time may be short so that the core portion of the nickel complex oxide precursor is porous with low density, and may be from about 30 minutes to about 2 hours, for example, from about 1 hour to about 2 hours.

A pH of a reaction solution may be adjusted to be form about 10.5 to about 11.0.

In order to prepare the surface portion of the nickel complex oxide precursor to be in a highly densified state, a reaction time of the second nickel complex oxide may be very slow, and may be from about 8 to about 10 hours, for example, from about 9 to 10 hours, or about 10 hours.

A pH of a reaction solution may be adjusted to be from about 11.5 to about 12.0.

While adjusting the reaction time, the concentration of the base material may be adjusted simultaneously, in the forming of the nickel complex oxide precursor.

For example, the method may further include adjusting a concentration of sodium hydroxide (NaOH) to be from about 6 to 12 moles.

In order to prepare the core portion of the nickel complex oxide precursor to have low lithium ion concentration and to be porous during the forming of the nickel complex oxide precursor, the concentration of the NaOH may be high, from about 10 to about 12 moles, for example from about 11 to 12 moles.

In order to prepare the surface portion of the nickel complex oxide precursor to have high lithium ion concentration and high density, the concentration of the NaOH may be low, from about 5 to 7 moles, for example, from about 5 to 6 moles.

Details about controlling reaction conditions in the coprecipitation method are well known in the related art, and thus will not be described herein.

The method includes forming the lithium nickel complex oxide by mixing the lithium-containing material to the nickel complex oxide precursor and thermally treating the resultant, wherein the lithium ions are distributed in the concentration gradient continuously decreasing from the surface portion to the core portion of the lithium nickel complex oxide.

The lithium-containing material is not specifically limited, and may be lithium hydroxide, lithium carbonate, or lithium oxide, and for example, may be lithium carbonate ($Li_2CO_3$) and/or lithium hydroxide (LiOH).

In the forming of the lithium nickel complex oxide, a temperature for the thermal treating may be from about 700 to about 1000° C., for example, from about 800 to about 1000° C.

Here, the thermal treating may be performed by increasing a temperature at a rate of about 1 to 5° C./min, maintaining the temperature for a predetermined time, and then naturally decreasing the temperature.

When the temperature is within the above range, the lithium nickel complex oxide having unresolved lithium ions and different concentrations of lithium ions in the surface portion and the core portion may be prepared.

The temperature may be maintained for about 30 minutes to about 1 hour, for example, from about 40 minutes to about 1 hour.

In order to prepare the lithium nickel complex oxide that includes the lithium ions only in the surface portion and not in the core portion, the temperature may be maintained from about 4 to 20 hours, for example, from about 5 to 20 hours, while the other conditions, such as the temperature, are the same.

One or more embodiments also include a lithium battery including: a positive electrode including a positive electrode active material, in which lithium ions are distributed in a concentration gradient continuously decreasing from a surface portion to a core portion of a lithium nickel complex oxide; a negative electrode; and an electrolyte.

The positive electrode may include a current collector and a positive electrode active material layer.

The positive electrode active material layer may include the positive electrode active material including a lithium nickel complex oxide, in which concentration of the lithium ions are different from the surface portion to the core portion of the lithium nickel complex oxide. This has been described above in detail.

The positive active material layer may further include a compound (lithiated intercalation compound) which allows reversible intercalation and deintercalation of lithium ions. Examples of the compound may include compounds represented by the following formulae.

$Li_aA_{1-b}X_bD_2$ (wherein $0.95 \leq a \leq 1.1$ and $0 \leq b \leq 0.5$); $Li_aE_{1-b}X_bO_{2-c}D_c$ (wherein $0.95 \leq a \leq 1.1$, $0 \leq b \leq 0.5$, and $0 \leq c \leq 0.05$); $LiE_{2-b}X_bO_{4-c}D_c$ (wherein $0 \leq b \leq 0.5$ and $0 \leq c \leq 0.05$); $Li_aNi_{1-b-c}Co_bB_cD_\alpha$ (wherein $0.95 \leq a \leq 1.1$, $0 \leq b \leq 0.5$, $0 \leq c \leq 0.05$, and $0 \leq \alpha \leq 2$); $Li_aNi_{1-b-c}Co_bX_cO_{2-\alpha}M_\alpha$ (wherein $0.95 \leq a \leq 1.1$, $0 \leq b \leq 0.5$, $0 \leq c \leq 0.05$, and $0 \leq \alpha \leq 2$); $Li_aNi_{1-b-c}Co_bX_cO_{2-\alpha}M_2$ (wherein $0.95 \leq a \leq 1.1$, $0 \leq b \leq 0.5$, $0 \leq c \leq 0.05$, and $0 \leq \alpha \leq 2$); $Li_aNi_{1-b-c}Mn_bX_cD_\alpha$ (wherein $0.95 \leq a \leq 1.1$, $0 \leq b \leq 0.5$, $0 \leq c \leq 0.05$, and $0 \leq \alpha \leq 2$); $Li_aNi_{1-b-c}Mn_bX_cO_{2-\alpha}M_\alpha$ (wherein $0.95 \leq a \leq 1.1$, $0 \leq b \leq 0.5$, $0 \leq c \leq 0.05$, and $0 \leq \alpha \leq 2$); $Li_aNi_{1-b-c}Mn_bX_cO_{2-\alpha}M_2$ (wherein $0.95 \leq a \leq 1.1$, $0 \leq b \leq 0.5$, $0 \leq c \leq 0.05$, and $0 \leq \alpha \leq 2$); $Li_aNi_bE_cG_dO_2$ (wherein $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (wherein $0.90 \leq a \leq 1.1$, $0 \leq b \leq 0.9$, $0 \leq c \leq 0.5$, $0 \leq d \leq 0.5$, and $0 \leq e \leq 0.1$.); $Li_aNiG_bO_2$ (wherein $0.90 \leq a \leq 1.1$ and $0.001 \leq b \leq 0.1$.); $Li_aCoG_bO_2$ (wherein $0.90 \leq a \leq 1.1$ and $0.001 \leq b \leq 0.1$.); $Li_aMnG_bO_2$ (wherein $0.90 \leq a \leq 1.1$ and $0.001 \leq b \leq 0.1$.); $Li_aMn_2G_bO_4$ (wherein $0.90 \leq a \leq 1.1$ and $0 \leq b \leq 0.1$.); $QO_2$; $QS_2$; $LiQS_2$; $V_2O_5$; $LiV_2O_5$; $LiZO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$; and lithium titanate.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

The positive electrode active material layer may also include a binder.

The binder strongly binds active material particles together and to the current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and a polymer having ethylene oxide, polyvinylpyrrolidone, polyurethane, polytetrafluoroethylene, polyvinylidene fluoride, polyethylene, polypropylene, styrene-butadiene rubber (SBR), acrylated SBR, and epoxy resin, nylon.

Examples of the current collector include aluminum (Al) and copper (Cu), but are not limited thereto.

The positive electrode active material layer may be prepared by preparing a composition for forming the positive electrode active material layer by mixing the positive electrode active material and the binder (selectively includes a conductor), in a solvent, and then coating the composition on the current collector. Since a method of preparing a positive electrode is well known in the related art, descriptions thereof will be omitted herein. The solvent may be N-methylpyrrolidone, but is not limited thereto.

The negative electrode may include a negative electrode active material layer and a current collector.

Examples of the negative electrode active material include natural graphite, silicon/carbon complex ($SiO_x$), a silicon metal, a silicon thin film, a lithium metal, a lithium alloy, a carbon material, and graphite. An example of the lithium alloy include lithium titanate. Examples of the lithium titanate include a spinel type lithium titanate, anatase type lithium titanate, and ramsdellite type lithium titanate, according to a crystalline structure. In detail, the negative electrode active material may be represented by $Li_{4-x}Ti_5O_{12}$ (wherein $0 \leq x \leq 3$). For example, the negative electrode active material may be $Li_4Ti_5O_{12}$, but is not limited thereto.

A binder and a solvent used to form a composition for forming the negative electrode active material layer may be identical as those used in the composition for forming the positive electrode active material layer. A conductor that may be selectively included in the composition for forming the negative electrode active material layer may be selected from, but not limited to, the group consisting of carbon black, Ketjen black, acetylene black, artificial graphite, natural graphite, copper powder, nickel powder, aluminum powder, silver powder, and polyphenylene.

A plasticizer may be further added to the compositions for forming the positive electrode active material layer and the negative electrode active material layer to form pores inside an electrode plate.

The electrolyte solution may include a nonaqueous organic solvent and a lithium salt.

The nonaqueous organic solvent may function as a migration medium of ions involved in electrochemical reactions in batteries.

Examples of the nonaqueous organic solvent may include carbonates, esters, ethers, ketones, alcohols, and aprotic solvents. Examples of the carbonates available as the nonaqueous organic solvent may include dimethyl carbonate (DMC), diethyl carbonate (DEC), dipropyl carbonate (DPC), methylpropyl carbonate (MPC), ethylpropyl carbonate (EPC), methyl ethyl carbonate (MEC), ethylene carbonate (EC), propylene carbonate (PC), butylene carbonate (BC), and ethyl methyl carbonate (EMC). Examples of the esters available as the nonaqueous organic solvents may include methyl acetate, ethyl acetate, n-propyl acetate, dimethyl acetate, methyl propionate, ethyl propionate, γ-butyrrolactone, decanolide, valerolactone, mevalonolactone, and caprolactone. Examples of the ethers available as the nonaqueous organic solvent may include dibutyl ether, tetraglyme, diglyme, dimethoxyethane, 2-methyltetrahydrofuran, and tetrahydrofuran. An example of the ketones available as the nonaqueous organic solvent may be cyclohexanone. Examples of the alcohols available as the nonaqueous organic solvent may include ethyl alcohol, isopropyl alcohol, and the like. Examples of the non-protonic solvents may include nitrils, such as R—CN (wherein R is a straight, branched or cyclic C2-C20 hydrocarbon group, which may have a double-bonded aromatic ring or an ether bond); amides, such as dimethylformamide; dioxolanes, such as 1,3-dioxolane; and sulfolanes.

The nonaqueous organic solvent may be used alone. Alternatively, at least two of the nonaqueous organic solvents may be used in combination. In this case, a mixing ratio of the at least two of the nonaqueous organic solvents may appropriately vary according to the performance of the battery, which is obvious to one of ordinary skill in the art.

The lithium salt is dissolved in the organic solvent and functions as a source of lithium ions in the battery, enabling the basic operation of the lithium battery. In addition, the lithium salt facilitates the migration of lithium ions between the positive electrode and the negative electrode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, and $LiB(C_2O_4)_2$(LiBOB; lithium bis(oxalato) borate). The concentration of the lithium salt may be in the range of about 0.1 to about 2.0M. When the concentration of the lithium salt is within this range, the electrolyte may have an appropriate conductivity and viscosity, and thus may exhibit excellent performance, thereby allowing lithium ions to effectively migrate.

A separator may exist between the positive electrode and the negative electrode, according to a type of the lithium battery. The separator may be a at least two multi-layered film of polyethylene, polypropylene, polyvinylidene, fluoride, or thereof, or may be a mixed multi-layered film of polyethylene/polypropylene, polyethylene/polypropylene/polyethylene, or polypropylene/polyethylene/polypropylene.

The lithium battery may be classified into a lithium ion battery, a lithium ion polymer battery, or a lithium polymer battery according to types of separators and electrolytes, may be classified into a cylindrical type, a rectangular type, a coin type, or a pouch type according to a shape, and may be classified into a bulk type or a thin film type according to a size. Moreover, the lithium battery may be used as a primary battery as well as a secondary battery. Methods of preparing the primary and secondary batteries are well known in the related art, and thus descriptions thereof will be omitted herein.

Thereinafter, one or more embodiments will be described in detail with reference to the following examples. These examples are for illustrative purposes only and are not intended to limit the scope of the one or more embodiments.

EXAMPLES

Example 1

Preparation of Lithium Nickel Complex Oxide Including $Li_{1.1}[Ni_{0.5}Co_{0.2}Mn_{0.3}]O_2$ as Surface Portion and $Li_{0.9}[Ni_{0.5}Co_{0.2}Mn_{0.3}]O_2$ as Core Portion A mixed solution was prepared in such a way that a Ni:Co:Mn mole ratio of nickel nitrate, manganese nitrate, and cobalt nitrate is 0.5:0.2:0.3. A 3 M core portion of a nickel complex oxide $(Ni_{0.5}Co_{0.2}Mn_{0.3}(OH)_2)$ precursor was formed by continuously adding a 10 to 15 M ammonia solution as an additive to the mixed solution for 5 to 10 hours, adding a 12 M sodium hydroxide aqueous solution thereto, and maintaining a pH of the resultant to be 11.5.

Then, another mixed solution was prepared in such a way that a Ni:Co:Mn mole ratio of nickel nitrate, manganese nitrate, and cobalt nitrate is the same as above, i.e., 0.5:0.2:0.3. A 0.5 M surface portion of the nickel complex oxide $(Ni_{0.5}Co_{0.2}Mn_{0.3}(OH)_2)$ precursor was prepared by adding 0.6 M sodium hydroxide aqueous solution to the other mixed solution and maintaining a pH of the resultant to be 10.5.

A positive electrode active material of a lithium nickel complex oxide was prepared by mixing $Li_2CO_3$ with the nickel complex oxide precursor at about 900° C. for less than 1 hour, in such a way that the surface portion is $Li_{1.1}[Ni_{0.5}Co_{0.2}Mn_{0.3}]O_2$, the core portion is $Li_{0.8}[Ni_{0.5}Co_{0.2}Mn_{0.3}]O_2$, and a Li/Ni mole ratio of the surface portion is 1.38 times a Li/Ni mole ratio of the core portion.

Example 2

Preparation of Lithium Nickel Complex Oxide Including $Li_{1.2}[Ni_{0.5}Co_{0.2}Mn_{0.3}]O_2$ as Surface Portion and $Li_{0.9}[Ni_{0.5}Co_{0.2}Mn_{0.3}]O_2$ as Core Portion A positive electrode active material of a lithium nickel complex oxide was prepared in the same manner as in Example 1, wherein a surface portion of the positive electrode active material is $Li_{1.2}[Ni_{0.5}Co_{0.2}Mn_{0.3}]O_2$, a core portion of the positive electrode active material is $Li_{0.9}[Ni_{0.5}Co_{0.2}Mn_{0.3}]O_2$, and a Li/Ni mole ratio of the surface portion is 1.5 times a Li/Ni mole ratio of the core portion, except that a concentration of a surface portion of the nickel complex oxide $(Ni_{0.5}Co_{0.2}Mn_{0.3}(OH)_2)$ precursor was 1 M while maintaining a pH to be 11.0.

Example 3

Preparation of Lithium Nickel Complex Oxide Including $Li_{1.1}[Ni_{0.6}Co_{0.2}Mn_{0.2}]O_2$ as Surface Portion and $Li_{0.9}[Ni_{0.6}Co_{0.2}Mn_{0.2}]O_2$ as Core Portion A positive electrode active material of a lithium nickel complex oxide was prepared in the same manner as in Example 1, wherein a surface portion of the positive electrode active material is $Li_{1.1}[Ni_{0.6}Co_{0.2}Mn_{0.2}]O_2$, a core portion of the positive electrode active material is $Li_{0.9}[Ni_{0.6}Co_{0.2}Mn_{0.2}]O_2$, and a Li/Ni mole ratio of the surface portion is 1.2 times a Li/Ni mole ratio of the core portion, except that the nickel complex oxide $(Ni_{0.6}Co_{0.2}Mn_{0.2}(OH)_2)$ precursor was prepared in such a way that the Ni:Co:Mn mole ratio of nickel nitrate, manganese nitrate, and cobalt nitrate was 0.6:0.2:0.2.

Example 4

Preparation of Lithium Nickel Complex Oxide Including $Li_{1.1}[Ni_{0.5}Co_{0.2}Mn_{0.3}]O_2$ as Surface Portion and $[Ni_{0.5}Co_{0.2}Mn_{0.3}]O_2$ as Core Portion A positive electrode active material of a lithium nickel complex oxide was prepared in the same manner as in Example 1, wherein a surface portion of the positive electrode active material is $Li_{1.1}[Ni_{0.5}Co_{0.2}Mn_{0.3}]O_2$ and a core portion of the positive electrode active material is $[Ni_{0.5}Co_{0.2}Mn_{0.3}]O_2$, except that $Li_2CO_3$ was mixed with the nickel complex oxide precursor at about 900° C. from 5 to 20 hours.

Example 5

Preparation of Lithium Battery

A positive electrode was prepared by preparing a 94 wt % of slurry composition of a positive electrode active material by adding 3 wt % of super P carbon black and 3 wt % of PVDF to each of the positive electrode active materials prepared according to Examples 1 through 4, and then coating and drying the slurry composition on a current collector of aluminum foil. Then, a lithium metal was used as a negative electrode and a separator was disposed between the positive electrode and the negative electrode. Then, a predetermined tension was applied to the resultant while winding the resultant. The resultant was inserted into a pouch constituting an exterior of a lithium battery and an electrolyte solution was injected to the exterior. Next, the exterior was sealed to prepare the lithium battery.

An amount of lithium ions on a surface of the positive electrode active material was measured by using XPS, a composition of the lithium ions of the lithium nickel complex oxide was analyzed by using ICP, and a heat value change of the lithium battery was measured. The results are shown in Table 1 below.

Comparative Example 1

Preparation of Lithium Nickel Complex Oxide Including $Li[Ni_{0.5}Co_{0.2}Mn_{0.3}]O_2$ as Surface and Core Portions A 1 M nickel complex oxide $(Ni_{0.5}Co_{0.2}Mn_{0.3}(OH)_2)$ precursor was obtained by mixing nickel nitrate, manganese nitrate, and cobalt nitrate to have a Ni:Co:Mn mole ratio of 0.5:0.2:0.3.

A 10 to 15 M ammonia solution constituting an additive was continuously added to the nickel complex oxide precursor for 5 to 10 hours and a 6 M sodium hydroxide aqueous solution was added thereto to maintain a pH of the resultant to be from 10.5 to 11.5.

A reaction time of the nickel complex oxide precursor was from 5 to 15 hours, and $Li_2CO_3$ was mixed to the nickel complex oxide precursor for about 900° C. from 10 to 20 hours to obtain a lithium nickel complex oxide (Li

[Ni$_{0.5}$Co$_{0.2}$Mn$_{0.3}$]O$_2$), wherein a Li/Ni mole ratio of a surface portion and a Li/Ni mole ratio of a core portion are the same.

Comparative Example 2

Lithium Battery Prepared by Using Lithium Nickel Complex Oxide Including Li[Ni$_{0.5}$Co$_{0.2}$Mn$_{0.3}$]O$_2$ as Surface and Core Portions A lithium battery was prepared in the same manner as in Example 5, except that the lithium nickel complex oxide prepared in Comparative Example 1 was used.

A composition of the lithium ions of the lithium nickel complex oxide was analyzed and a heat value change of the lithium battery was measured in the same manner as in Example 5, and the results are shown in Table 1 below.

TABLE 1

| | Li/Ni Mole Ratio of Core Portion and Li/Ni Mole Ratio of Surface Portion | | Li/Ni Mole Ratio of Surface Portion with respect to Li/Ni Mole Ratio of Core Portion | Heat Value Change (J/g) |
|---|---|---|---|---|
| Example 1 | Surface Portion | 2.2 | 1.38 | 980 |
| | Core Portion | 1.6 | | |
| Example 2 | Surface Portion | 2.4 | 1.50 | 950 |
| | Core Portion | 1.8 | | |
| Example 3 | Surface Portion | 1.8 | 1.22 | 975 |
| | Core Portion | 1.5 | | |
| Comparative Example 1 | Surface Portion | 2 | 1 | 1000 |
| | Core Portion | 2 | | |

Referring to Table 1, the lithium batteries prepared by using the lithium nickel complex oxides of Examples 1 through 3 have less heat value changes than the lithium battery prepared by using the lithium nickel complex oxide of Comparative Example 1. Accordingly the lithium batteries prepared by using the lithium nickel complex oxides of Examples 1 through 3 are thermally stable, and thus have excellent charging and discharging characteristics.

As described above, a lithium battery using a positive electrode according to the one or embodiments has excellent electrochemical characteristics and thermal stability.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A positive electrode active material for a secondary lithium battery comprising lithium nickel complex oxide material having a surface portion and a core portion, in which lithium ions are distributed in a concentration gradient decreasing from the surface portion to the core portion of the lithium nickel complex oxide material;
wherein the surface portion of the positive active electrode material comprises a lithium nickel complex oxide represented by Formula 2 below, and a core portion of the positive active electrode material comprises a lithium nickel complex oxide represented by Formula 3 below:

$$Li_a[Ni_xCo_yMn_z]O_2 \qquad \text{<Formula 2>}$$

wherein in Formula 2, 1.1≤a≤1.2, 0.5≤x≤0.6, 0.2≤y≤0.3, 0.2≤z≤0.3, and x+y+z=1; and

$$Li_a[Ni_xCo_yMn_z]O_2 \qquad \text{<Formula 3>}$$

wherein in Formula 3, 0.8≤a≤0.9 0.5≤x≤0.6, 0.2≤y≤0.3, 0.2≤z≤0.3 and x+y+z=1, and wherein, in the lithium nickel complex oxide, a mole ratio of lithium to nickel of the surface portion of the lithium nickel complex oxide is from 1.22 to 1.5 times a mole ratio of lithium to nickel of the core portion of the lithium nickel complex oxide.

2. The positive electrode active material of claim 1, wherein the surface portion of the positive active electrode material comprises a lithium nickel complex oxide represented by Formula 4 below and wherein the core portion of the positive active electrode material comprises a nickel complex oxide represented by Formula 5 below:

$$Li_a[Ni_xCo_yMn_z]O_2 \qquad \text{<Formula 4>}$$

$$Li_a[Ni_xCo_yMn_z]O_2 \qquad \text{<Formula 5>}$$

wherein in Formula 4, 1.1≤a≤1.2, 0.5≤x≤0.6, 0.2≤y≤0.3, 0.2≤z≤0.3, and x+y+z=1, and wherein in Formula 5, a=0, 0.5≤x≤0.6, 0.2≤y≤0.3, 0.2≤z≤0.3, and x+y+z=1.

3. The positive electrode active material of claim 1, wherein a mole ratio of lithium to nickel of the surface portion of the lithium nickel complex oxide is from about 1.83 to about 2.4.

4. The positive electrode active material of claim 1, wherein a mole ratio of lithium to nickel of the core portion of the lithium nickel complex oxide is from about 1.3 to about 1.8.

5. The positive electrode active material of claim 1, wherein a mole ratio of lithium to cobalt and a mole ratio of lithium to manganese of the surface portion of the lithium nickel complex oxide are from about 3.6 to about 6.0; and
wherein a mole ratio of lithium to cobalt and a mole ratio of lithium to manganese of the core portion of the lithium nickel complex oxide are from about 2.6 to about 4.5.

6. A secondary lithium battery comprising:
a positive electrode comprising a positive electrode active material comprising lithium nickel complex oxide material having a surface portion and a core portion, in which lithium ions are distributed in a concentration gradient decreasing from the surface portion to the core portion of the lithium nickel complex oxide material;
a negative electrode; and
an electrolyte; and
wherein the surface portion of the lithium nickel complex oxide is represented by Formula 2 below, and the core portion of the lithium nickel complex oxide is represented by Formula 3 below:

$$Li_a[Ni_xCo_yMn_z]O_2 \qquad \text{<Formula 2>}$$

$$Li_a[Ni_xCo_yMn_z]O_2 \qquad \text{<Formula 3>}$$

wherein in Formula 2, 1.1≤a≤1.2, 0.5≤x≤0.6, 0.2≤y≤0.3, 0.2≤z≤0.3, and x+y+z=1, and wherein in Formula 3, 0.8≤a≤0.9 0.5≤x≤0.6, 0.2≤y≤0.3, 0.2≤z≤0.3, and x+y+z=1, and wherein, in the lithium nickel complex oxide, a mole ratio of lithium to nickel of the surface portion of the lithium nickel complex oxide is from 1.22 to 1.5 times a mole ratio of lithium to nickel of the core portion of the lithium nickel complex oxide.

7. The secondary lithium battery of claim 6, wherein, in the lithium nickel complex oxide, a mole ratio of lithium to nickel of the surface portion of the lithium nickel complex oxide material is from about 1.02 to about 1.8 times a mole ratio of lithium to nickel of the core portion of the lithium nickel complex oxide material.

8. A method of manufacturing a positive electrode active material comprising a lithium nickel complex oxide for a lithium battery comprising:

mixing a nickel salt solution, a cobalt salt solution, and a manganese salt solution to form a mixture;

adding a base to the mixture to form a nickel complex oxide precursor;

adding a lithium-containing material to the nickel complex oxide precursor;

subjecting the nickel complex oxide precursor to thermal treatment for about 1 hour or less, wherein lithium ions are distributed in a concentration gradient decreasing from a surface portion of the lithium nickel complex oxide to a core portion of the lithium nickel complex oxide, and wherein the surface portion of the lithium nickel complex oxide is represented by Formula 2 below, and wherein the core portion of the lithium nickel complex oxide is represented by Formula 3 below:

$$Li_a[Ni_xCo_yMn_z]O_2 \qquad \text{<Formula 2>}$$

$$Li_a[Ni_xCo_yMn_z]O_2 \qquad \text{<Formula 3>}$$

wherein in Formula 2, $1.1 \le a \le 1.2$, $0.5 \le x \le 0.6$, $0.2 \le y \le 0.3$, $0.2 \le z \le 0.3$, and $x+y+z=1$, and wherein in Formula 3, $0.8 \le a \le 0.9$ $0.5 \le x \le 0.6$, $0.2 \le y \le 0.3$, $0.2 \le z \le 0.3$, and $x+y+z=1$, and wherein, in the lithium nickel complex oxide, a mole ratio of lithium to nickel of the surface portion of the lithium nickel complex oxide is from 1.22 to 1.5 times a mole ratio of lithium to nickel of the core portion of the lithium nickel complex oxide.

9. The method of claim 8, wherein the nickel salt solution has a concentration from about 0.5 to about 3.5 M.

10. The method of claim 8, wherein a reaction time of forming the core portion of the nickel complex oxide precursor is from about 30 minutes to about 2 hours.

11. The method of claim 8, wherein a reaction time of forming the surface portion of the nickel complex oxide precursor is from about 8 hours to about 10 hours.

12. The method of claim 8, wherein, the thermal treatment temperature is from about 700° C. to about 1000° C.

13. The method of claim 8, wherein, the thermal treatment is performed for from about 30 minutes to about 1 hour.

* * * * *